Patented June 21, 1938

2,121,619

UNITED STATES PATENT OFFICE 2,121,619

PRESERVATION OF RUBBER

Ira Williams, Woodstown, N. J., and Arthur Morrill Neal, Wilmington, Del., assignors to E. I. du Pont de Nemours & Company, Wilmington, Del., a corporation of Delaware No Drawing. Application September 18, 1937,
Serial No. 164,496

18 Claims. (Cl. 18—50)

This invention relates to the preservation of rubber and more particularly to a new class of compounds which when incorporated in the rubber tend to inhibit that deterioration of rubber which is due to the action of heat, light and oxidation.

Many substances have heretofore been proposed for incorporation into rubber for retarding the deterioration which rubber normally undergoes when exposed to light, heat and air. Among such compounds which have been successfully used heretofore for this purpose, are certain organic nitrogen compounds such as the amines and particularly the secondary aromatic amines.

An object of this invention is to provide rubber having improved age-resisting properties. A further object is to provide a new class of deterioration inhibitors for rubber. Still further and other objects are to provide a new composition of matter and to advance the art. Other objects will appear hereinafter.

These objects are accomplished by the following invention which comprises incorporating with rubber a compound of the class represented by the formula:

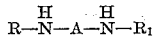

in which R represents an alkyl or aralkyl group, $R_1$ represents hydrogen or an alkyl or aralkyl group and A represents a diphenyl nucleus.

The term "aralkyl" as employed in the specification and claims is to be understood to mean an aliphatic group in which one or more of the hydrogen atoms are replaced by an aryl group or groups which may have one or more alkyl groups substituted in the aryl group or groups.

The term "diphenyl nucleus", as employed in the specification and claims, is to be understood to mean two phenyl groups directly connected together and either one or both of which may have an alkyl or alkoxy group substituted in the ring.

These compounds may be prepared by heating, either with or without a solvent, benzidine or a substituted benzidine, such as ortho tolidine or ortho dianisidine, and an aralkyl or alkyl halide, such as benzyl chloride, a-naptho benzyl chloride, b-naphtho benzyl chloride, butyl chloride, propyl chloride, isopropyl chloride, amyl chloride, crotyl chloride, allyl chloride and their isomers and homologues.

Some of the compounds which we have found to possess the property of inhibiting the deterioration of rubber to a marked degree when incorporated in the rubber are benzyl benzidine, symmetrical dibenzyl benzidine, benzyl tolidine, benzyl dianisidine, allyl benzidine, and butyl benzidine.

In order to more clearly point out the advantageous results obtainable with this new class of compounds, stocks were prepared according to the following table:

Table I

|  | Stocks | | | | |
| --- | --- | --- | --- | --- | --- |
|  | A | B | C | D | E |
| Smoked sheets | 100 | 100 | 100 | 100 | 100 |
| Zinc oxide | 5 | 5 | 5 | 5 | 5 |
| Sulfur | 6 | 6 | 6 | 6 | 6 |
| Diphenyl guanidine | 1 | 1 | 1 | 1 | 1 |
| Benzyl benzidine |  | 1 |  |  |  |
| Dibenzyl benzidine |  |  | 1 |  |  |
| Benzyl tolidine |  |  |  | 1 |  |
| Benzyl dianisidine |  |  |  |  | 1 |

These stocks were vulcanized to a comparable state of cure and then were subjected to an accelerated aging test in which vulcanized slabs of the various stocks were suspended in a Geer oven maintained at 70° C. in a constantly renewed stream of air. The results of this test are given in the following table:

Table II

| Stock | Original tensile | After 10 days in Geer oven tensile |
| --- | --- | --- |
| A | 4100 | 542 |
| B | 3715 | 2880 |
| C | 3965 | 2520 |
| D | 4160 | 2400 |
| E | 4000 | 3270 |

In order to still further show the advantageous effects of these compounds stocks were prepared according to the following table:

Table III

|  | Stocks | | | | |
| --- | --- | --- | --- | --- | --- |
|  | A | B | C | D | E |
| Smoked sheets | 100 | 100 | 100 | 100 | 100 |
| Zinc oxide | 10 | 10 | 10 | 10 | 10 |
| Sulfur | 4 | 4 | 4 | 4 | 4 |
| Diphenyl guanidine | 1 | 1 | 1 | 1 | 1 |
| Benzyl benzidine |  | 1 |  |  |  |
| Allyl benzidine |  |  | 1 |  |  |
| Benzyl tolidine |  |  |  | 1 |  |
| Butyl benzidine |  |  |  |  | 1 |

These stocks were also vulcanized to a comparable state of cure and were then tested by hanging slabs of the various stocks in a Bierer-Davis bomb in which a constant temperature of 70° C. and a pressure of 300 pounds of oxygen was maintained for 48 hours. The results of these tests are given in Table IV.

Table IV

| Stock | Original tensile | After 48 hours in bomb tensile |
|---|---|---|
| A | 3500 | 400 |
| B | 3175 | 2475 |
| C | 3525 | 2375 |
| D | 3175 | 2350 |
| E | 3050 | 1775 |

Other compounds of this class which merit special attention are those in which R and/or $R_1$ in the formula:

represent an aralkyl group in which the aryl constituent is substituted. Representative members of this type of compound have the formula:

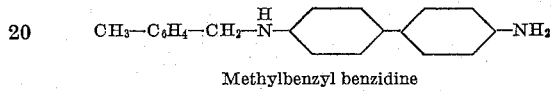

Methylbenzyl benzidine and

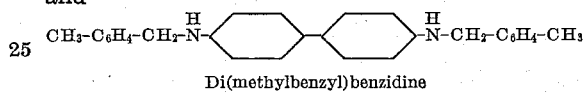

Di(methylbenzyl)benzidine

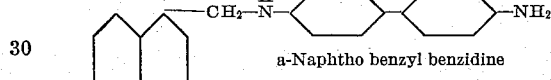

a-Naphtho benzyl benzidine

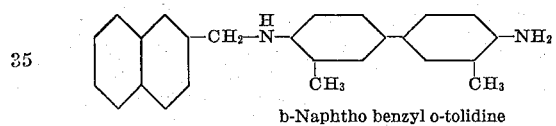

b-Naphtho benzyl o-tolidine

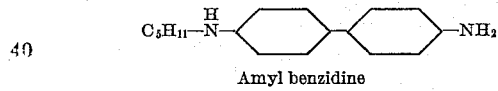

Amyl benzidine

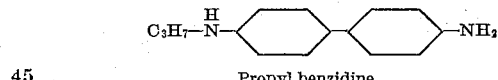

Propyl benzidine

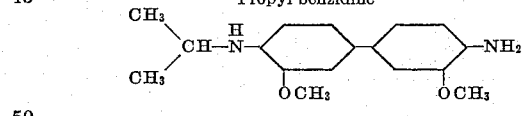

Isopropyl o-dianisidine

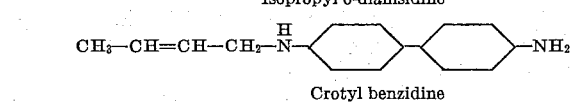

Crotyl benzidine

It is also possible to make compounds in which R and $R_1$ of the formula:

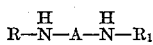

represent different groups. Representative members of this type of compound have the following formula:

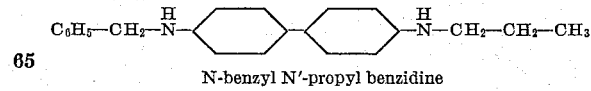

N-benzyl N'-propyl benzidine and

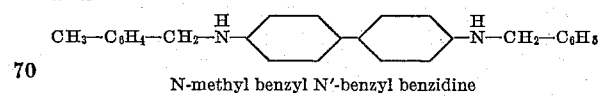

N-methyl benzyl N'-benzyl benzidine

From the above tests it will be apparent that the members of this class of compounds are very effective in increasing the age-resisting properties of rubber when incorporated therein prior to vulcanization. These compounds are equally effective when incorporated in a vulcanized rubber by any of the commonly employed methods, such as treating the vulcanized rubber with a solution of the compound.

While, in the above tests, we have disclosed the employment of about 1% of the deterioration inhibitor, it is to be understood that this amount may be varied according to the requirements of the rubber stock and the desire of the user.

This is in part a continuation of our copending application Serial No. 600,054, filed March 19, 1932, for "Preservation of rubber".

While we have disclosed certain specific compounds and the use of certain specific proportions thereof in certain specific processes, it is to be understood that the same are given merely by way of illustration and various modifications thereof will readily appear to those skilled in the art within the scope of our invention. Accordingly, our invention is to be limited solely by the appended claims construed as broadly as is permissible in view of the prior art.

We claim:

1. The method of increasing the age-resisting properties of rubber which comprises incorporating in the rubber a small amount of a compound having the formula

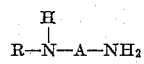

wherein A represents a diphenyl nucleus and R represents a member of the group consisting of alkyl and aralkyl groups.

2. The method of increasing the age-resisting properties of rubber which comprises incorporating in the rubber a small amount of a compound having the formula

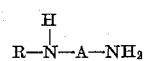

wherein A represents a diphenyl nucleus and R represents an alkyl group.

3. The method of increasing the age-resisting properties of rubber which comprises incorporating in the rubber a small amount of a compound having the formula

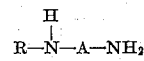

wherein A represents a diphenyl nucleus and R represents an aralkyl group.

4. The method of increasing the age-resisting properties of rubber which comprises incorporating in the rubber a small amount of a compound having the formula

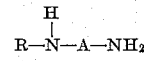

wherein A represents a diphenyl nucleus and R represents an aralkyl group containing a single benzene ring.

5. The method of increasing the age-resisting properties of rubber which comprises incorporating in the rubber a small amount of a compound having the formula

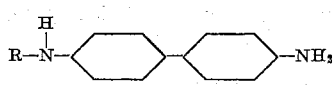

wherein R represents an alkyl group.

6. The method of increasing the age-resisting properties of rubber which comprises incorporating in the rubber a small amount of a compound having the formula

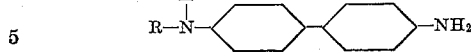

wherein R represents an aralkyl group.

7. The method of increasing the age-resisting properties of rubber which comprises incorporating in the rubber a small amount of a compound having the formula

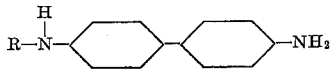

wherein R represents an aralkyl group containing a single benzene ring.

8. The method of increasing the age-resisting properties of rubber which comprises incorporating in the rubber a small amount of benzyl benzidine.

9. Rubber having incorporated therein a small amount of a compound having the formula

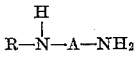

wherein A represents a diphenyl nucleus and R represents a member of the group consisting of alkyl and aralkyl groups.

10. Rubber having incorporated therein a small amount of a compound having the formula

wherein A represents a diphenyl nucleus and R represents an alkyl group.

11. Rubber having incorporated therein a small amount of a compound having the formula

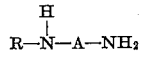

wherein A represents a diphenyl nucleus and R represents an aralkyl group.

12. Rubber having incorporated therein a small amount of a compound having the formula

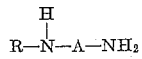

wherein A represents a diphenyl nucleus and R represents an aralkyl group containing a single benzene ring.

13. Rubber having incorporated therein a small amount of a compound having the formula

where R represents an alkyl group.

14. Rubber having incorporated therein a small amount of a compound having the formula

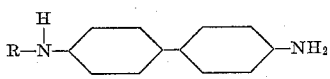

wherein R represents an aralkyl group.

15. Rubber having incorporated therein a small amount of a compound having the formula

wherein R represents an aralkyl group containing a single benzene ring.

16. Rubber having incorporated therein a small amount of benzyl benzidine.

17. The method of increasing the age-resisting properties of rubber which comprises incorporating in the rubber a small amount of benzyl dianisidine.

18. Rubber having incorporated therein a small amount of benzyl dianisidine.

IRA WILLIAMS.
ARTHUR MORRILL NEAL.